July 21, 1964  J. M. HUEY  3,141,443
PROTECTIVE COVER FOR DOGS
Filed July 16, 1963  3 Sheets-Sheet 1
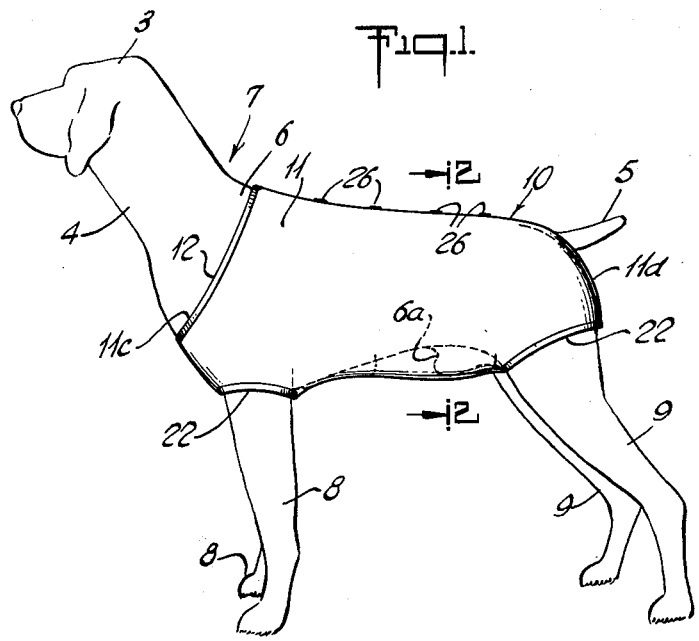
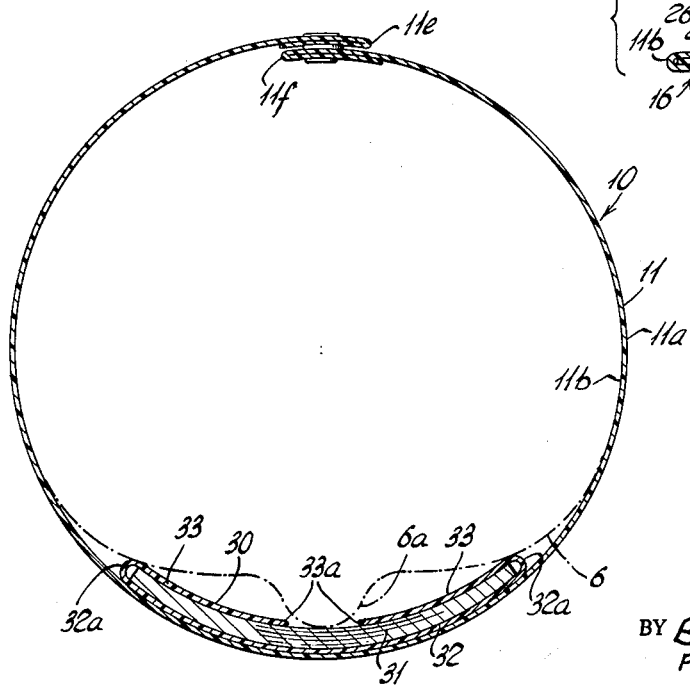
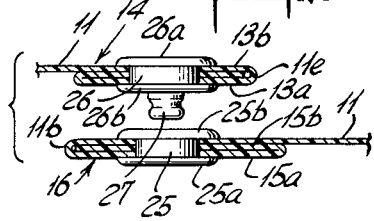
INVENTOR.
JOAN M. HUEY
BY Blum, Moscovitz,
Friedman, Blum & Kaplan
ATTORNEYS

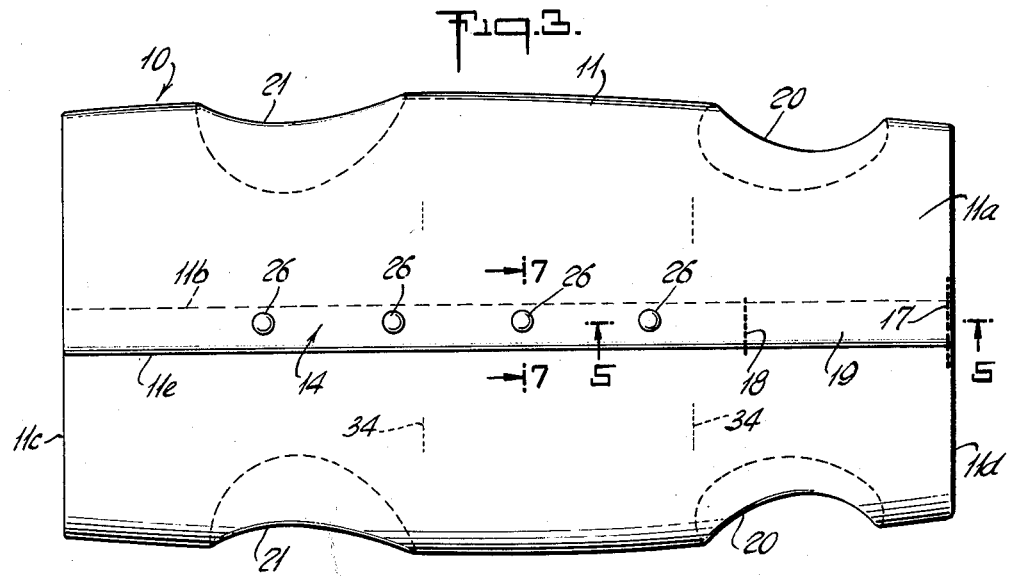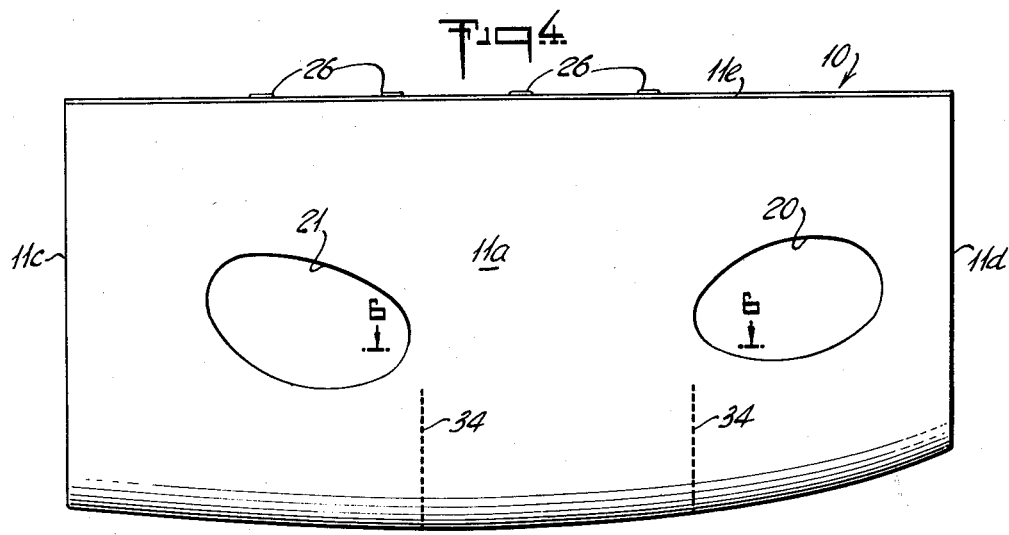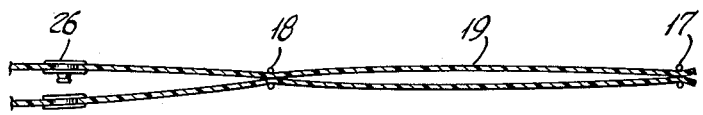

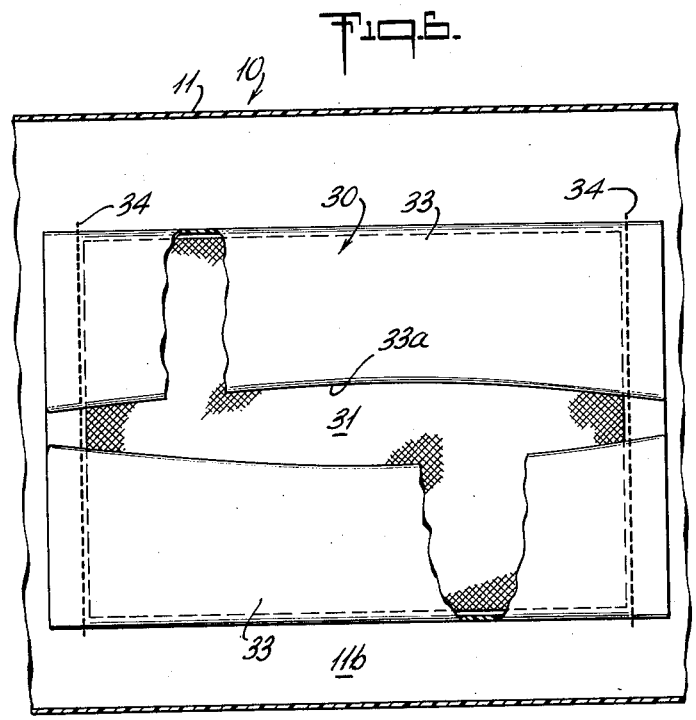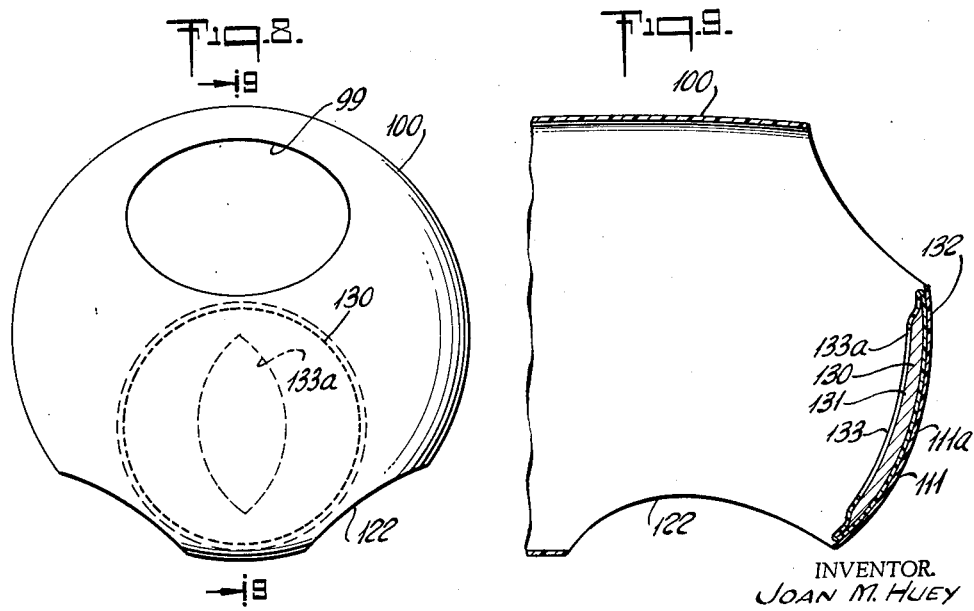

3,141,443
PROTECTIVE COVER FOR DOGS
Joan M. Huey, 408 E. 88th St., New York, N.Y.
Filed July 16, 1963, Ser. No. 295,299
4 Claims. (Cl. 119—143)

This invention relates to an improved protective cover for dogs and the like, and particularly relates to an improved protective cover having means for holding a diaper for training purposes and also for protection of the female dog during mating season.

One object of the invention is to provide an improved cover of the above-described type which is inexpensive, easy to fabricate, comfortable and easy to apply to and remove from the animal.

Another object of the invention is to provide an improved protective cover of the above-described type into which the dog can "step in" and out of which the dog can "step out," with simple separable fasteners to maintain the cover securely upon the animal during use.

Another object of the invention is to provide a protective cover which eliminates the need for fastening straps.

Another object of the invention is to provide a basic cover construction which can be used, with minor adaptation, for either male or female dogs.

In accordance with preferred embodiments of the invention, the protective cover comprises a flexible sheet of material of generally rectangular shape which is formed into open ended part tubular sheath shape with the side edges of the sheet permanently joined in the rear portion of the sheet. The sheet has four openings positioned for step in location of the dog's legs therethrough with the tubular portion of the sheet then extended around the animal's hindquarters and with the side edges of the sheet over the top of the dog's body.

The side edges of the sheet have releasable fastening means forwardly of the permanently joined portions which can then be closed to complete formation of the sheet into a sheath around the dog's body with the legs extended through the openings. The sheath has means on its inner surface for reception of a pad and positioned to maintain said pad covering the desired body organ of the body.

It will be apparent that after use, the separable fasteners can be opened, and the dog can step out of the cover. Accordingly, the cover is particularly advantageous in ease of application to and removal from the dog.

Other objects and advantages of the invention will become apparent from the following description, in conjunction with the annexed drawing, in which preferred embodiments of the invention are disclosed.

In the drawing,

FIG. 1 is a perspective view of a first embodiment of the cover, showing it applied to a male dog;

FIG. 2 is a section on line 2—2 of FIG. 1;

FIG. 3 is a top plan view of the cover;

FIG. 4 is a side elevation of the cover;

FIG. 5 is a fragmentary section on line 5—5 of FIG. 3;

FIG. 6 is a fragmentary section on line 6—6 of FIG. 4;

FIG. 7 is a fragmentary section on line 7—7 of FIG. 3;

FIG. 8 is a rear elevation of a second embodiment of the protective cover, for application to a female dog; and FIG. 9 is a fragmentary section on line 9—9 of FIG. 8.

In the following description, it will be understood that while reference is to male and female dogs, the invention also has application to other four-legged mammals.

*FIGS. 1–7*

The protective cover 10 in accordance with this embodiment of the invention is formed from a flexible sheet of material 11. The material 11 is preferably of waterproof flexible plastic, such as the well-known vinyl or polyethylene plastics. Optionally, the material is transparent or translucent. Sheet 11 is generally rectangular, although it may be contoured and sized to conform to the configuration of the particular dog to which the cover is to be applied. Reference is made to the drawing, which is substantially to scale of a working model of this embodiment of the invention, to complete the disclosure as to one representative shape of sheet 11.

Sheet 11 has an outer surface 11a and an inner surface 11b and has front end 11c and rear end 11d. The front end 11c of sheet 11 is reinforced by edge binding 12. Such edge binding is shown in FIG. 1 and omitted in other views since it is not essential to an understanding of the invention. The rear end 11d of sheet 11 may have similar edge binding, this being omitted in the drawing as not essential to an understanding the invention.

As shown in FIG. 7 (and not shown in detail in other views), the material 11 is folded along one longitudinal edge to form underlying panels 13a and 13b these being secured together to form an edge seam 14 having a side edge 11e. Similarly, the material 11 is folded along its other longitudinal edge to form underlying panels 15a and 15b to form an edge seam 16 having a side edge 11f.

The sheet 11 is formed into an open ended part tubular sheath shape with the edge seams 14 and 16 overlapped, seam 14 being uppermost. As clearly shown in FIGS. 3 and 5, the overlapped seams 14 and 16 are secured together by any suitable means such as lateral stitching lines 17 and 18, the stitching 17 being at the extreme rear of cover 10 and the stitching 18 being at a point relatively near the extreme rear end. Accordingly, the longitudinal edges 11e and 11f are permanently joined in a zone 19 in the rear portion of sheet 11 to form the part tubular sheath shape.

Sheet 11 has rear openings 20 and front openings 21 respectively for reception of the rear legs 9 and front legs 8 of male dog 7. As shown in FIG. 1 (and not shown in other views for simplicity of illustration), these openings 20 and 21 are reinforced by edge binding 22. The exact size, shape and location of the openings 20 and 21 is dependent upon the dog to which the cover is to be applied, and it is believed sufficient to refer to the scale drawings to complete the disclosure in this regard of one representative arrangement.

When the dog "steps in" to the cover with extension of its legs through the leg openings, the tubular rear portion of the sheath then extends around the hindquarters of the body 6 of dog 7. The tail 5 extends through the rear opening the sheath, and the body 6 along with the neck 4 and head 3 project forwardly of the front open end of cover 10. In this position, the longitudinal cover edges 11e and 11f of cover 10 are centered along the top of body 6.

The seams 14 and 16 are provided with any suitable releasable fastening means forwardly of the joined zone 19. While separate snap fasteners are shown, it will be understood that any other suitable fastening means, such as slide fasteners, buttons or the like may be employed. FIG. 7 best shows the particular fasteners employed, which are conventional and accordingly not described in detail. FIG. 7 shows a female socket fastener 25 on seam 16 with its enlarged heads 25a and 25b securing together the layers 11, 15b and 15a. Fig. 7 also shows the male fastener 26 on seam 14 with its enlarged heads 26a and 26b holding together the layers 13a, 13b and 11. The downwardly projecting stud 27 on fastener 26 is adapted to be snapped in the usual manner into the receptacle in the female fastener 25, further details being conventional and accordingly not shown or described in detail.

By way of illustration, as shown in FIG. 3, there may be four such male fasteners 26 on seam 14, and will be understood that there may be correspondingly four female fasteners 25 in proper location on seam 16. In any event, when the paired fasteners are snapped together, the full length sheath is completed, extending around the dog's body 6 and with the legs through the leg openings as described above.

Further in accordance with the invention, cover sheath 10 has pocket means 30 on its inner surface 11b, at the bottom thereof when applied to the animal, said pocket means 30 being adapted for reception of a pad 31 and positioned to maintain pad 31 covering a selected body organ 6a of dog 7. In accordance with the invention, the selected organ is the male external organ.

While any suitable pocket 30 may be employed, preferably the pocket 30, best shown in FIGS. 2 and 6, is formed of the same material as sheet 11 and comprises a bottom panel 32 folded as its side edges 32a to form overlying top panels 33. The pocket 30 is generally rectangular in shape, and the two panels 33 are separate along their inner edges 33a. The bottom panel 32 may be secured by any suitable stitching 34 to material 11. Any suitable absorbent diaper pad 31 may be placed within pocket 30, as clearly shown in the drawing. This pad 31 preferably is substantially coextensive in area with the area of the pocket so that it will be maintained securely in place without sliding. As shown diagrammatically in FIG. 2, any discharge from organ 6a will be received by pad 31.

It will be apparent that pad 31 serves several purposes. In the first place, pad 31 may receive urination or other discharge for protection when the dog is indoors. Furthermore, the cover and pad serve for training purposes, as in the case of an infant, since the dog will prefer the dry pad. Furthermore, the protective cover prevents intercourse when the female dog is in heat.

The cover is particularly advantageous in the light of its flexibility, water-proof quality and ease of application to and removal from the dog. Thus, with the fasteners open, it is a simple matter to insert the legs of the dog into the open cover, and with a small amount of training the dog can assist in this operation. It is then only necessary to snap the fasteners closed. Removal is even easier, since after separation of the fasteners, the cover may be moved downwardly and rearwardly to clear the secured zone 19 off the top of the body and to move the legs out of the leg openings. Again, with a minimum amount of training, the dog can facilitate this operation and can "step out" of the cover.

FIGS. 8-9

As a particular feature of the invention, the cover can be adapted, with minor changes, to the female dog. For convenience, it is only necessary to show the rear portion of the cover 100 of the second embodiment since the front portion will be essentially the same as in the first embodiment. Thus, the snap fasteners and the front leg openings will be substantially the same in both embodiments. As shown in this embodiment, the cover 100 has rear leg openings 122. The material 11 has a portion 111a located behind the openings 122, which is shaped and located to receive a pocket 130, similar to pocket 30 of the first embodiment, in proper position relative to the female organ of the dog. Above pocket 130, the cover 100 is provided with a tail opening 99. In this embodiment, the pocket 130 may be generally circular with outer panel 132 and inner panel 133 having an opening 133a for reception of circular pad 131 between the two panels.

While I have disclosed a preferred embodiment of the invention, and have indicated various possible changes, omissions and additions which may be made therein, it will be apparent that various other changes, omissions and additions may be made in the invention without departing from the scope and spirit thereof.

I claim:
1. Protective cover for four-legged mammals such as dogs, comprising a flexible sheet of water-proof plastic having an inner surface, an outer surface, front and rear ends and longitudinal edges, said sheet being formed into open-ended part-tubular sheath shape with said longitudinal edges permanently joined in the rear portion of said sheet, said sheet having four openings in the plane of said sheet and positioned for step-in location of the mammal's legs therethrough with the tubular portion of said sheet around the mammal's hindquarters and with said longitudinal edges over the top of the mammal's body, said longitudinal edges having releasable fastening means forwardly of their permanently joined portions which can then be closed to complete formation of said sheet into a sheath around the mammal's body with the legs extended through said openings, said sheath having means on its inner surface for releasably holding a pad- and positioned to maintain said pad covering a body of said mammal.

2. Protective cover according to claim 1, said pad reception means being located forwardly of the rear leg openings.

3. Protective cover according to claim 1, said pad reception means being located rearwardly of said rear leg openings.

4. Protective cover for four-legged mammals, such as dogs, comprising a flexible sheet of water-proof plastic having an inner surface, an outer surface, front and rear ends and longitudinal edges, said sheet being formed into open-ended part-tubular sheath shape with said longitudinal edges permanently joined in the rear portion of said sheet, said sheet having four openings in the plane of said sheet and positioned for step-in location of the mammal's legs therethrough with the tubular portion of said sheet around the mammal's hindquarters and with said longitudinal edges over the top of the mammal's body, said longitudinal edges having releasable fastening means forwardly of their permanently joined portions which can then be closed to complete formation of said sheet into a sheath around the mammal's body with the legs extended through said openings, a pocket on the inner surface of said sheath for releasably holding a pad and positioned to maintain said pad covering a body organ of said mammal, said pocket comprising a generally rectangular bottom panel and two overlying top panels having longitudinal and lateral edges, each of said top panels having one of their longitudinal edges connected to a respective longitudinal edge of the bottom panel, means connecting the respective lateral edges of the bottom and top panels together and to said sheath, the remaining longitudinal edges of the respective top panels being separate from each other to form the opening of said pocket defined by the top and bottom panels.

References Cited in the file of this patent

UNITED STATES PATENTS

| | | |
|---|---|---|
| 1,772,827 | Caster-Udell | Aug. 12, 1930 |
| 2,222,705 | Conlon | Nov. 26, 1940 |
| 2,400,781 | Priour | May 21, 1946 |
| 2,443,831 | Miller | June 22, 1948 |
| 2,539,606 | Bailey | Jan. 30, 1951 |